United States Patent

Nojiri et al.

[11] Patent Number: 5,915,514
[45] Date of Patent: Jun. 29, 1999

[54] CLUTCH UNIT FOR AUTOMATICALLY CANCELLING CONNECTION BETWEEN INPUT SOURCE AND OUTPUT SHAFT

[75] Inventors: Hiromi Nojiri, Iwata; Isao Mikuriya; Masahiro Kawai, both of Hamamatsu; Chikashi Okamoto, Toyonaka; Chiharu Azuma, Takarazuka, all of Japan

[73] Assignees: NTN Corporation, Osaka; Nippon Cable System, Inc., Takarazuka, both of Japan

[21] Appl. No.: 08/693,259

[22] PCT Filed: Dec. 26, 1995

[86] PCT No.: PCT/JP95/02669

§ 371 Date: Nov. 21, 1996

§ 102(e) Date: Nov. 21, 1996

[87] PCT Pub. No.: WO96/20853

PCT Pub. Date: Jul. 4, 1996

[30] Foreign Application Priority Data

Dec. 26, 1994 [JP] Japan .................................. 6-321848

[51] Int. Cl.$^6$ ...................................................... F16D 43/02
[52] U.S. Cl. .............................. 192/38; 192/12 R; 192/35
[58] Field of Search ...................................... 192/38, 12 R, 192/15, 43.1, 44, 45.1, 41 A, 35, 37

[56] References Cited

U.S. PATENT DOCUMENTS

| 3,055,471 | 9/1962 | Warn et al. ........................ 192/38 X |
| 3,150,750 | 9/1964 | Georges ............................... 192/38 |
| 4,901,831 | 2/1990 | Ito et al. .............................. 192/38 |
| 5,016,740 | 5/1991 | Ito et al. .............................. 192/38 |
| 5,135,084 | 8/1992 | Ito et al. .............................. 192/38 |
| 5,355,981 | 10/1994 | Itoh et al. ............................. 192/35 |

FOREIGN PATENT DOCUMENTS

7-310766  11/1995  Japan .

*Primary Examiner*—Charles A. Marmor
*Assistant Examiner*—Saúl Rodríguer
*Attorney, Agent, or Firm*—Nikaido, Marmelstein, Murray & Oram LLP

[57] ABSTRACT

A clutch comprises an inner rotatable member 1, an outer rotatable member 2 serving as an output shaft, a plurality of rollers 3 serving as torque transmission members disposed between the Inner and outer rotatable members, and a retainer 4 serving as an Input shaft. The retainer 4 Is connected to a motor 7, which serves as an input source, through a wore and wormwheel mechanism 6. A viscous fluid, e.g., a highly viscous fluid 10 such as silicone oil, is sealed In a clearance between the Inner rotatable member 1 and a shaft member 8, and a centring spring 12 is interposed between the inner rotatable member 1 and the retainer 4.

3 Claims, 8 Drawing Sheets

DIRECTION OF ROTATION OF MOTOR

CLUTCH UNIT FOR AUTOMATICALLY CANCELLING CONNECTION BETWEEN INPUT SOURCE AND OUTPUT SHAFT

BACKGROUND OF THE INVENTION

The present invention relates to a clutch unit interposed between the Input and output members for transmitting and interrupting torque in an opening and closing mechanism, such as an automobile power window. electrically-powered slide door (one-box car), electrically-powered curtain or the like.

For example, the electrically-powered slide door of an automobile is usually designed such that the rotative power of the driving motor is reduced in speed by a worm and wormwheel mechanism and then transmitted through a solenoid clutch to an output shaft for opening and closing the door. Reducing the speed of the driving motor by a worm and wormwheel mechanism requires the use of a small-sized motor because of the limited installation space and the high rpm and low torque at which the driving motor runs, as compared with the low rpm and high torque of the output shaft necessary for the output shaft to open and close the door. Further, the use of a solenoid clutch is intended to make it possible to open and close the door by manual power input from the output shaft, i.e., by manual operation. That is, since the gear reduction ratio of a worm and wormwheel mechanism is generally high, the connection between the driving motor and the output shaft has to be cancelled before manual opening and closing of the door during stoppage of the driving motor can be made possible.

However. Interposition of a solenoid clutch between the driving motor and the output shaft is liable to increase the power consumption and complicate the control system.

SUMMARY OF THE INVENTION

An object of the invention is to provide a mechanism which is capable of automatically cancelling the connection between the input source and the output shaft during stoppage of the input source by means of mechanical construction.

A clutch unit according to the present invention comprises an inner rotatable member, an outer rotatable member, torque transmission members disposed between the inner and outer rotatable members and adapted to effect torque transmission or interruption through wedge engagement/ disengagement between the inner and outer rotatable members, a retainer for retaining the torque transmission members, one of the three members, the inner rotatable member, outer rotatable member and retainer, being used as an input member connected to a rotation driving source, one of the other two being used as a differential member, an elastic member for connecting the input member and the differential member in the direction of rotation, a fixed member brake-fixed or fixed to a stationary member in the direction of rotation, and a viscous fluid present between the differential member and the fixed member, wherein the engagement/disengagement of the torque transmission members is controlled by the relative rotation of the differential member effected through the viscous fluid or elastic member.

Upon rotation of the input member, the differential member connected thereto in the direction or rotation through the elastic member is rotated. At this time, the differential member is subjected to the viscoshear resistance of the viscous fluid present between it and the fixed member. For this reason, the elastic member flexes in the direction of rotation, resulting in a corresponding amount of relative rotation (delay in rotation of the differential member) produced between the differential member and the input member. And the relative rotation of the differential member brings the torque transmission members into wedge engagement with the inner and outer rotatable members. Thereby, the torque from the input member is transmitted to the output member through the torque transmission members.

When the input source stops and so does the rotation of the input member and differential member, the viscoshear resistance of the viscous fluid disappears, so that the elastic recovery force of the elastic member enables the differential member to rotate relative to the input member (in the direction opposite to the aforesaid one) to effect the centering of the two members as to their circumferential positions. The centering of the two members causes the torque transmission members to cone out of the wedge engagement with the inner and outer rotatable members, whereby the output member is released from the input member.

As has been described so far, the clutch unit of the present invention has the function of automatically interrupting torque transmission between the input and output members during stoppage of the input source and automatically releasing the output member from the input member, Therefore, the use of the clutch unit of the invention in a power transmission system, for example, in the electrically-powered slide door, power window or electrically-powered curtain of an automobile, makes it possible to open and close the slide door, window or curtain by manual or other means from the output shaft during stoppage of the driving motor; therefore, the convenient features of these devices can be further improved. Furthermore, since the clutch unit of the present invention effects the transmission and interruption of torque automatically and mechanically, there is no danger of increasing the power consumption or complicating the control system.

In this connection, in the case where the force with which the torque transmission members engage the input and output members is high, there is a possibility that the centering of the differential member may not be effected quickly by only the elastic force from the elastic member. In such case, quick and reliable centering of the differential member can be effected by rotating the input member backward from the rotation stop position by a predetermined amount by reversing means.

BRIEF DESCRIPTION OF THE DRAWINGS

FIG. 10 is a sectional view (FIG. 10a) taken along the line B—B in FIG. 9 and a sectional view (FIG. 10b) taken along the line C—C in FIG. 9;

FIGS. 11(a) and (b) are enlarged section views showing a peripheral region including the can surface shown in FIG. 10a;

DESCRIPTION OF PREFERRED EMBODIMENTS

An embodiment of the invention will now be described with reference to the drawings.

Figure 1:
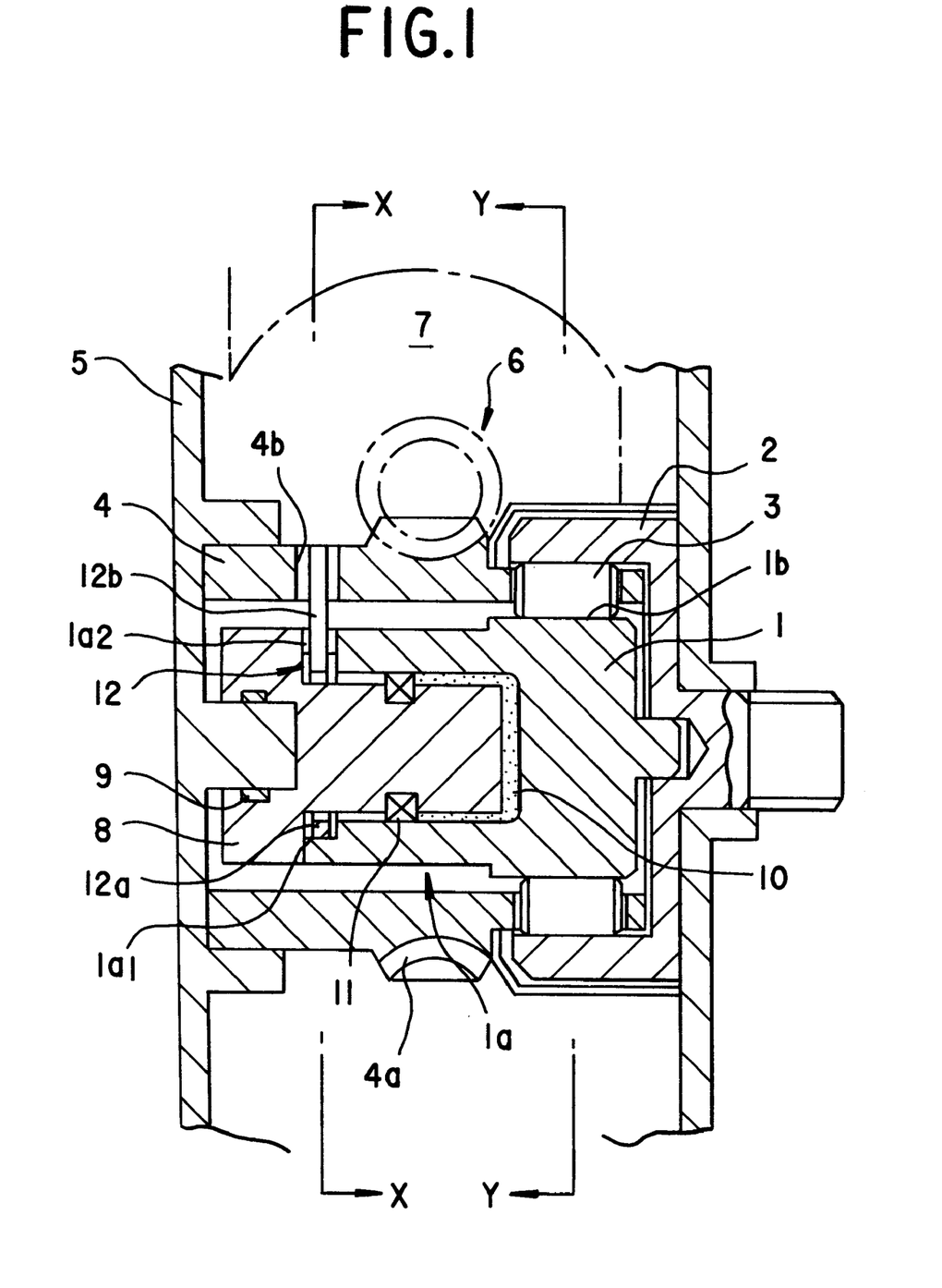
FIG. 1 is a sectional view showing the power transmission system of a power window in an automobile using a clutch unit according to an embodiment of the invention.

FIG. 1 shows a power transmission system for the power window of an automobile using a clutch unit of this embodiment. The clutch comprises an inner rotatable member 1, an outer rotatable member 2 serving as an output shaft, a plurality of rollers 3 interposed between the outer peripheral surface of the inner rotatable member 1 and the inner peripheral surface of the outer rotatable member 2 to serve as torque transmission members, and a retainer 4 serving as an input shaft, The retainer 4 and the outer rotatable member 2 are rotatably housed in a easing 5. Further, the retainer 4 is connected through a worm and wormwheel mechanism 6 to a motor 7 serving as an input source, and the outer rotatable member 2 is connected to a window opening and closing mechanism (omitted from illustration). In addition, in this embodiment, the wheel gear of the worm and wormwheel mechanism 6 is integrally formed on the outer diameter surface of the retainer 4.

One end of the inner rotatable member 1 forms a cup portion 1a, into which the other end of a shaft member 8 is inserted with axial and radial clearances. The shaft member 8, in this embodiment, is brake-fixed at its one end to the casing 5 in the direction of rotation by a brake member 9, so that only when it is subjected to a rotating force (torque) greater than the braking force of the braking member, it can be rotated with respect to the casing 5. In this embodiment, an O-ring is used as the brake member 9 and the amount of interference for the O-ring is adjusted to provide an optimum braking force, However, the brake member 9 is not limited to an O-ring, provided that it is capable of exerting a predetermined braking force on the shaft member 8. Further, the braking force is not limited to frictional force. And a viscous fluid, or a high viscosity fluid 10, such as silicone oil, is put in a clearance between the inner rotatable member 1 and the shaft member 8 and sealed therein by a seal 11.

Figure 2:
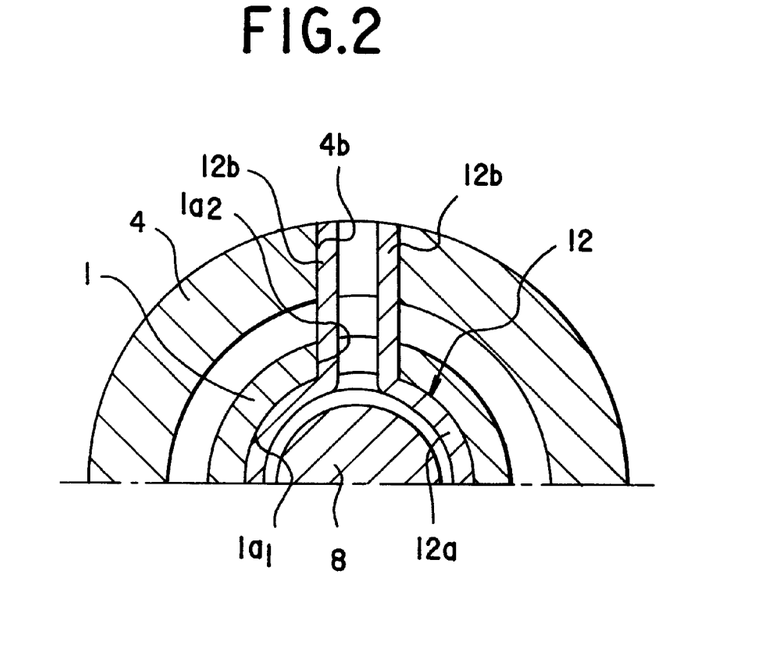
FIG. 2 is a sectional view taken along the line X—X in FIG. 1.

Interposed between the inner rotatable member 1 and the retainer 4 is a centering spring 12 as shown in FIG. 2 (section X—X in FIG. 1). The centering spring 13 comprises an annular portion 12a, and a pair of engaging portions 12b extending outwardly from the opposite ends of the annular portion 12a, said annular portion 12a being inserted in an annular step portion 1a1 formed in the inner diameter of the end of the cup portion 1a of the inner rotatable member 1. On the other hand, the pair of engaging portions 12b extend through a slit 1a2 formed in the end of the cup portion 1a of the inner rotatable member 1 to enter the engaging hole 4a of the retainer 4. In the state shown in FIG. 2, the pair of engaging portions 12b are in elastic contact with the circumferential walls of the slit 1a2 and the engaging hole 4b, whereby the inner rotatable member 1 and the retainer 4 are connected together in the direction of rotation and the circumferential positioning (centering) of the inner rotatable member 1 with respect to the retainer 4 is effected.

Figure 3:
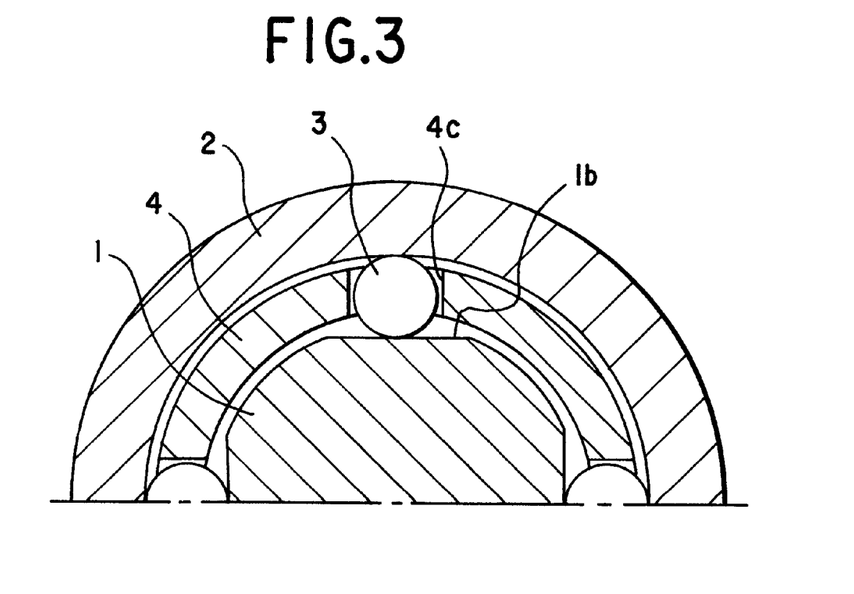
FIG. 3 is a sectional view taken along the line Y—Y in FIG. 1.
Figure 4:
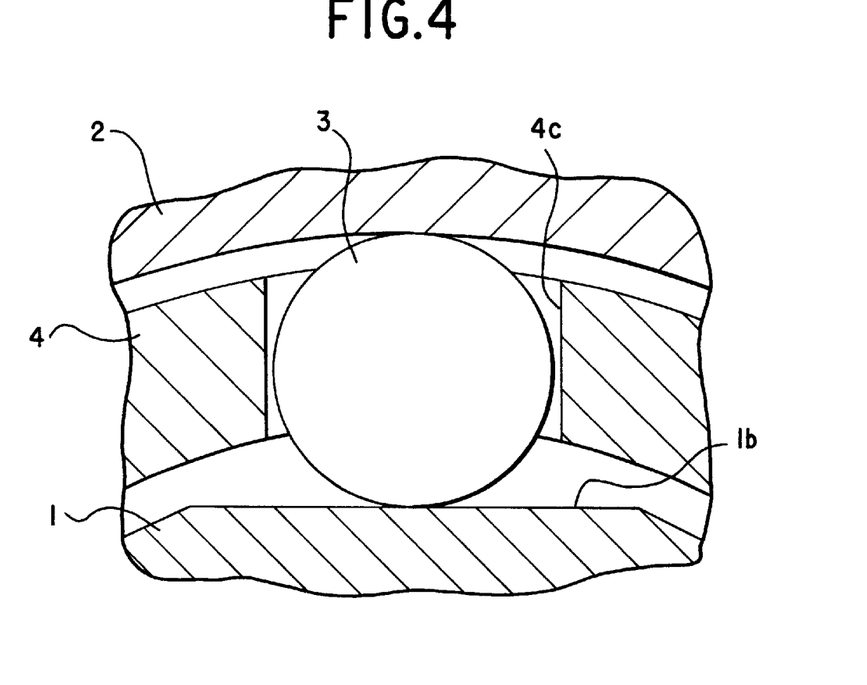
FIG. 4 is an enlarged sectional view showing a peripheral region including a can surface and a torque transmission member.

As shown in FIG. 3 (section Y—Y in FIG. 1) and in FIG. 4, the outer peripheral surface of the other end of the inner rotatable member 1 is formed with a plurality of cam surfaces 1b at circumferential equal intervals, with a wedge space defined between each cam surface 1b and the inner peripheral surface of the outer rotatable member 2 in both the forward and backward directions of rotation. Each roller 3 it disposed between the cam surface 1b and the inner peripheral surface of the outer rotatable member 2 and is held in a pocket 4c of the retainer 4. In addition, FIGS. 2 through 4 show a state in which the inner rotatable member 1 is centered by the centering spring 12, in which state, as shown in FIG. 4, the circumferential center of the pocket 4c of the retainer 4 coincides with the circumferential center of the cam surface 1b. Therefore, the roller 3 is positioned substantially in the middle of the cam surface 1b, and released from the wedge space for rotation in forward and backward directions. This state will be hereinafter referred to as the neutral position.

In FIG. 1, when the motor 7 starts rotating, its rotative power is transmitted at reduced speed to the retainer 4 through the worm and wormwheel mechanism 8, thereby rotating the retainer 4. And the inner rotatable member 1 receives the rotative powder from the retainer 4 through the centering spring 12 and is thereby rotated. At this time, the inner rotatable member 1 is subjected to the viscoshear resistance of the highly viscous fluid 10 interposed between it and the shaft member 8. As a result, the engaging portions 12b of the centering spring 12 flex, resulting in a corresponding amount of relative rotation (rotation delay of the inner rotatable member 1) produced between the retainer 4 and the inner rotatable member 1. In addition, let k1 be the elastic force of the centering spring 12 and K2 be the viscoshear resistance of the highly viscous fluid 10, then the relation K1<K2 is required in order for the engaging portions 12b of the centring spring 12 to flex.

Figure 5:
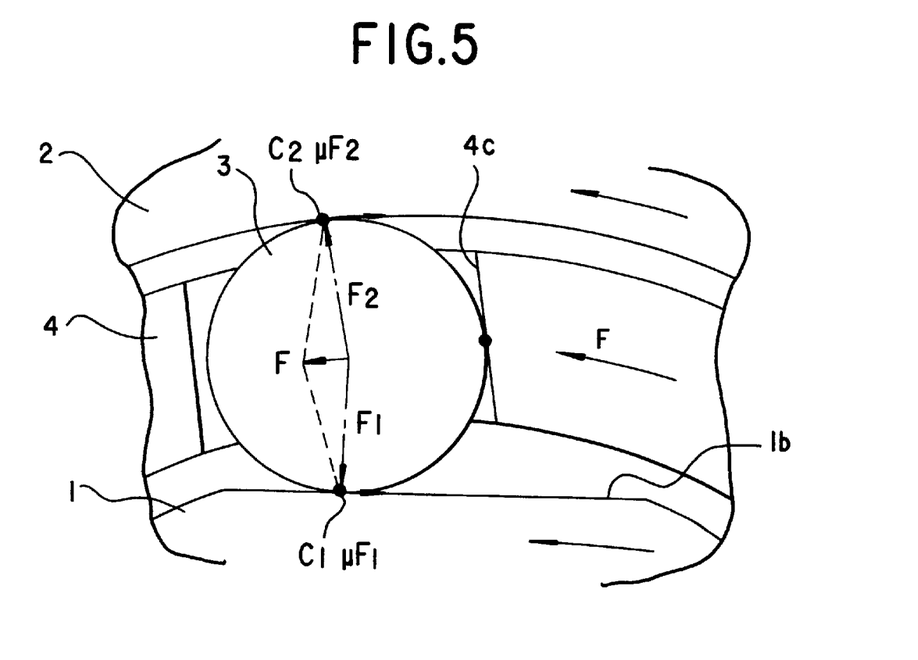
FIG. 5 is an enlarged sectional view showing a peripheral region including the can surface and the torque transmission member.

When the relative rotation is produced between the retainer 4 and the inner rotatable member 1, the roller 3 received in the pocket 4c in the retainer 4, as shown in FIG. 5, is pushed in the direction of rotation (direction of rotation of the retainer 4) by the retainer 4 and engages the wedge space in that direction. Let C1 and C2 be the points of contact between the roller 3 and the cam surface 1b and between the roller 3 and the inner peripheral surface of the outer rotatable member 2, respectively, and F be the force with which the retainer 4 pushes the roller 3, then frictional forces $\mu$ F1 and $\mu$ F2 (where $\mu$ is friction coefficient) are produced at the points of contact C1 and C2. By means of these frictional forces, the rotating power is transmitted from the retainer 4 to the outer rotatable member 2 via the roller 3, so that the outer rotatable member 2 is rotated together with the retainer 4 and inner rotatable member 1. The rotation of the outer rotatable member 2 opens or closes an unillustrated window.

On the other hand, during rotation of the inner rotatable member 1, the shaft member 8 is subjected to the viscoshear resistance of the highly viscous fluid 10 interposed between it and the inner rotatable member 1. This viscoshear resistance increases with the rotation of the inner rotatable member 1 and acts as a rotative force (torque) on the shaft member 8. The shaft member 8 is at rest as long as this rotative force is lower than the braking force of the brake member 9, but as soon as the rotative force becomes greater than the braking force, it starts rotating with respect to the casing 5. After entering into steady rotation, it makes concomitant rotation with an amount of delay corresponding to the braking force of the brake member 9 with respect to the inner rotatable member 1. After it has entered into steady rotation (after the clutch has shifted to the torque transmitting state), therefore, the viscoshear resistance of the highly viscous fluid 10 assumes a predetermined value corresponding to the braking force of the brake member 9, never assuming a greater value. The viscoshear resistance of the highly viscous fluid 10 is essentially a factor necessary for causing relative rotation between the retainer 4 and the inner rotatable member 1, i.e., for automatically shifting the clutch to the torque transmitting state, and after the clutch shift, it should desirably be as low as possible. Let K3 be the braking force of the brake member 9, then it is necessary to satisfy the relation K3≧K2 (viscoshear resistance upon clutch shift)>K1 (elastic force of the centering spring 12), and it is desirable that the braking force K3 be set at a minimum value in the range satisfying this relation.

When the motor 7 stops and the retainer 4 and inner rotatable member 1 stop rotating, the viscoshear resistance of the highly viscous fluid 10 disappears, so that the elastic recovery force of the centering spring 12 causes the inner rotatable member 1 to rotate with respect to the retainer 4 until it is centered at the neutral position shown in FIGS. 2 through 4. In addition, the inner rotatable member 1 is subjected to the viscoshear resistance from the highly viscous fluid 10 during relative rotation to the neutral position; however, since the viscoshear resistance is proportional to the relative rotational speed, the inner rotatable member 1 is allowed to rotate, though at a speed lower than that of the motor 7.

Then the inner rotatable member 1 is centered with respect to the retainer 4 in this manner, the rollers 3 are released from the wedge spaces to return to the neutral position, so that the outer rotatable member 2 becomes free with respect to the retainer 4 and inner rotatable member 1 and in released from the input system. Therefore, in this state, the outer rotatable member 2 can be manually rotated and hence even if the motor 7 is stopped, the window can be manually opened or closed.

Figure 6:
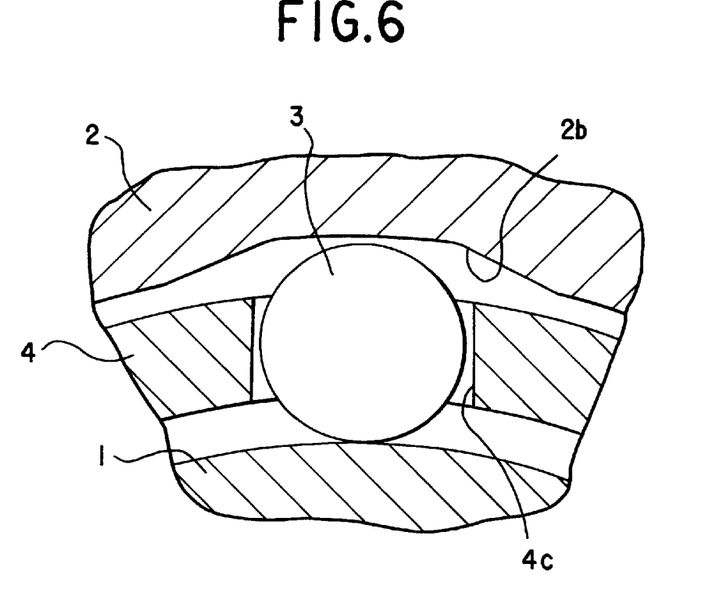
FIG. 6 is an enlarged sectional view showing a peripheral region including a cam surface and a torque transmission member according to another embodiment of the present invention.

An embodiment shown in FIG. 6 is provided with a groove-like can surface 2b in the inner periphery of the outer rotatable member 2 instead of said flat cam surface 1b. Defined between the cam surface 2b of the outer rotatable member 2 and the outer peripheral surface of the inner rotatable member 1 is a wedge space for forward and backward rotations. In this case, an elastic member corresponding to said centering spring 12 is interposed between the retainer 4 and the outer rotatable member 2 and a highly viscous fluid 10 is interposed between the outer rotatable member 12 and the rotatable member (brake-fixed to the stationary member) corresponding to said shaft member 8, whereby the same function and effect as those provided by the arrangement of the preceding embodiment can be obtained. Alternatively, though not shown, the outer peripheral surface of the inner rotatable member 1 may be formed with a groove-like cam surface instead of the flat can surface 1b.

Figure 7:
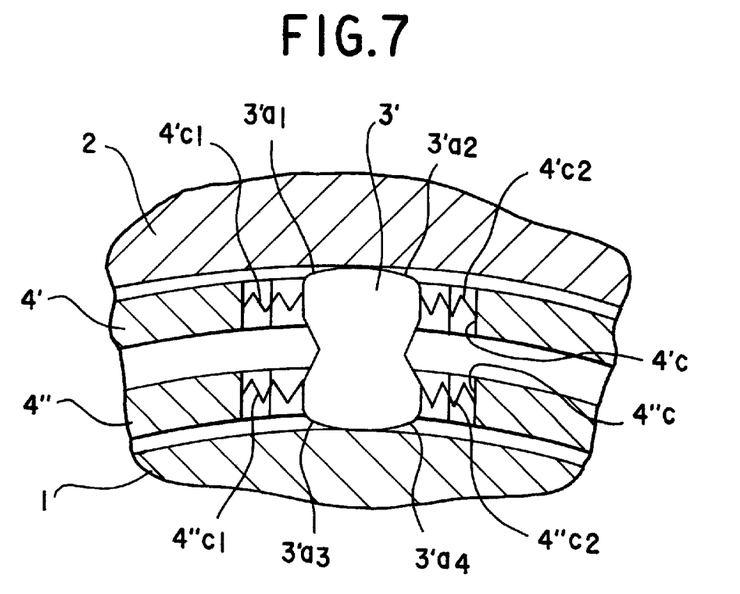
FIG. 7 is an enlarged sectional view showing a peripheral region including a torque transmission member according to another embodiment of the present invention.
Figure 8:
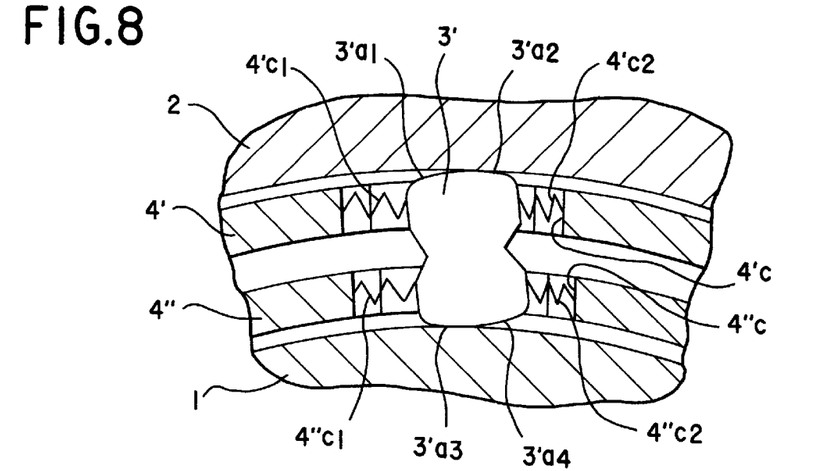
FIG. 8 is an enlarged sectional view showing a peripheral region including a torque transmission member according to another embodiment of the present invention.

An embodiment shown in FIG. 7 employs a sprag 3' serving as a torque transmission member. The rest of the basic arrangement is the same as in FIG. 1. The sprag 3' has can surfaces 3'a1, 3'a2, 3'a3, 3'a4 in the forward and backward directions and is received in the pockets 4'c and 4"c of the outer and inner retainers 4' and 4" through springs 4'c1, 4'c2, 4"c1, 4"c2. The outer retainer 4' is connected to the motor 7 through the worm and wormwheel mechanism 8, while the inner retainer 4" is fixed to the inner rotatable member 1 through suitable means. Further, a centering spring 12 shown in 1 is interposed between the inner rotatable member 1 and the outer retainer 4", and a highly viscous fluid 10 is sealed in a clearance between the inner rotatable member 1 and the shaft member 8 shown in FIG. 1. In the state shown in FIG. 7, the sprag 3' is held in the neutral position as it is uniformly pressed in circumferentially opposite directions by the springs 4'c1. 4'c2, 4"c1, 4"c2. In this state, the sprag 3' engages neither the outer peripheral surface of the inner rotatable member 1 nor the inner peripheral surface of the outer rotatable member 2. When the motor 7 starts rotating, a relative rotation takes place in the aforesaid manner between the inner rotatable member 1 and the inner retainer 42 fixed thereto (delay in rotation of the inner retainer 4"), so that, as shown in FIG. 8, the sprag 3' swings as it is pushed in the direction of rotation by the outer retainer 4' causing the can surfaces 3'a2, 3'a3 to engage both the outer peripheral surface of the inner rotatable member 1 and the inner peripheral surface of the outer rotatable member 2. Thereby, the torque 18 transmitted from the outer retainer 4' to the outer rotatable member 2 through the sprag 3', so that the outer rotatable member 2 is rotated integrally with the outer retainer 4', inner rotatable member 1, and inner retainer 4".

On the other hand, when the motor stops rotating, the inner rotatable member 1 and inner retainer 4" are centered with respect to the outer retainer 4' in the manner described above, so that the sprag 3' returns to the neutral position shown in FIG. 7, releasing the outer rotatable member 2 from the input system.

In addition, in the case where the inner retainer 4" is connected to the motor 7, an elastic member corresponding to the centering spring 12 shown in FIG. 1 is interposed between the inner retainer 4" and the outer rotatable member 2, while a highly viscous fluid 10 is interposed between the outer rotatable member 2 and a rotatable member corresponding to the shaft member 8 shown in FIG. 1. Further, in the above embodiment, the springs 4'c1 and 4'c2 and/or springs 4"c1 and 4c2 may be omitted.

Figure 9:
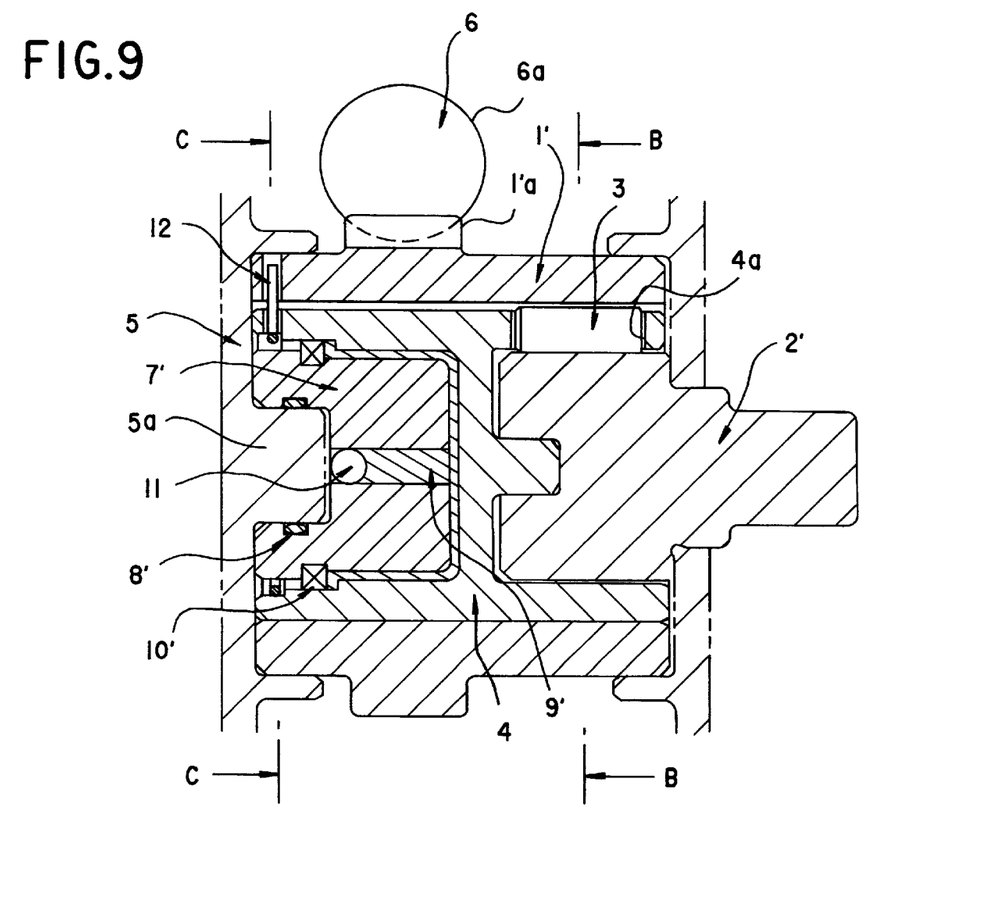
FIG. 9 is a sectional view (along the line A—A in FIG. 10a) showing a power transmission system for the electrically-powered slide door of an automobile (one-box car) using a clutch unit according to another embodiment of the invention

FIG. 9 shows a power transmission system for an electrically powered slide door in a one-box car. The clutch comprises an outer rotatable member 1' serving as an input shaft, an inner rotatable member 2' serving as an output shaft, a plurality of rollers 3 interposed between the inner peripheral surface of the outer rotatable member 1' and the outer peripheral surface of the inner rotatable member 2' to serve as torque transmission members, and a retainer holding the rollers 3. The outer and inner rotatable members 1' and 2' are rotatably housed in a casing 5. Further, the outer rotatable member 1' is connected through the worm shaft 6a of a worm and wormwheel mechanism 6 to a driving motor (omitted from illustration) and the inner rotatable member 2' is connected to an opening and closing mechanism (omitted from illustration), for an electrically powered slide door. In addition, in this embodiment, the wormwheel gear 1'a of the worm and wormwheel mechanism 6 is integrally formed on the outer diameter surface of the outer rotatable member 1'.

The retainer 4 is in the form of a cylindrical body substantially H-shaped in section, having at one end thereof a plurality of pockets 4*a* extending therethrough for receiving the rollers 3, and at the other end thereof a shaft member 7' inserted therein with axial and radial clearances. The shaft member 7', in this embodiment, is brake-fixed at its one end to the shaft portion 5*a* of the casing 5 in the direction of rotation by a brake member 8', so that only when it is subjected to a rotating force (torque) greater than the braking force of the braking member 8', it can be rotated with respect to the casing 5. In this embodiment, an O-ring is used as the brake member 8' and the amount of interference for the O-ring is adjusted to provide an optimum braking force. And a highly viscous fluid 10', such as silicone oil, is put in a clearance between the retainer 4 and the shaft member 7' and sealed therein by an oil seal 10' and a stop plug 11'. In addition, the brake member 8' is not limited to an O-ring, provided that it is capable of exerting a predetermined braking force on the shaft member 7'. Further, the braking force is not limited to frictional force.

Figure 10A:
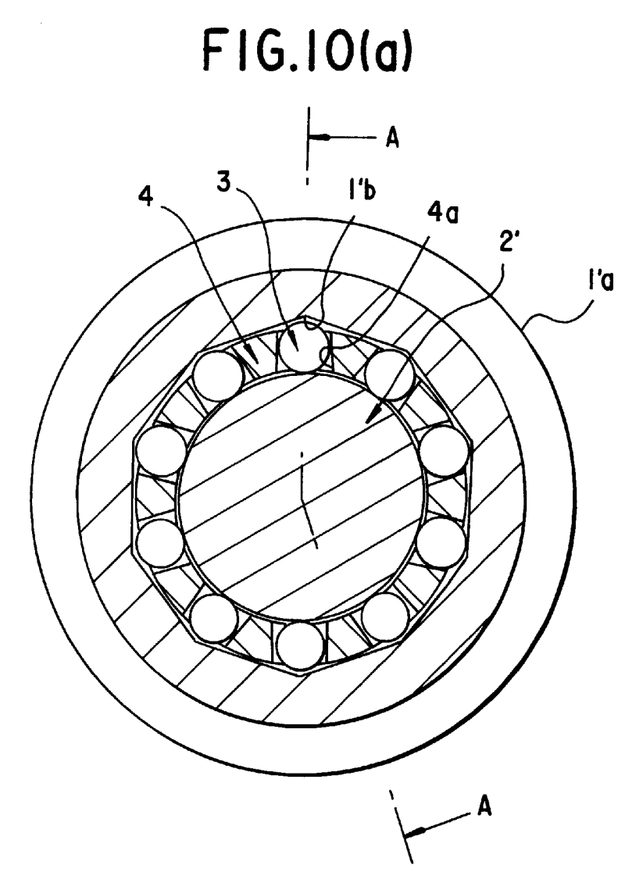
Figure 10B:
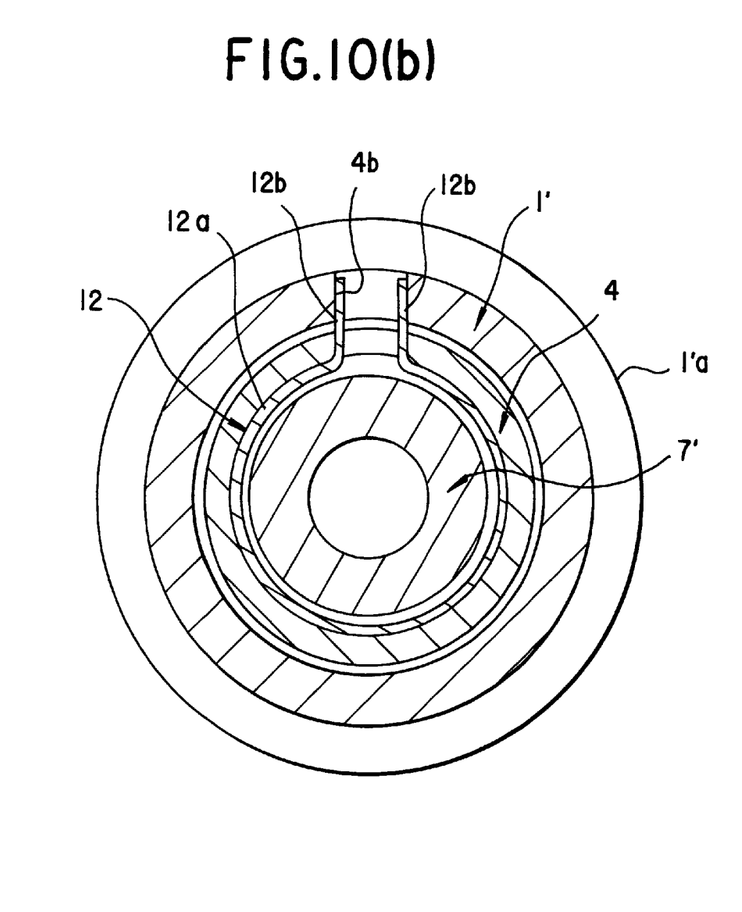

Interposed between the outer rotatable member 1' and the retainer 4 is a centering spring 12 as shown in FIG. 10 (b) (section C—C in FIG. 9). The centering spring 13 comprises an annular portion 12*a*, and a pair of engaging portions 12*b* extending outwardly from the opposite ends of the annular portion 12*a*, said annular portion 12*a* being inserted in the inner diameter of the retainer 4, said pair of engaging portions 12*b* being suitably mounted in a notch 4*b* formed in the end of the retainer 4. In the state shown in FIG. 10(*b*), the pair of engaging portions 12*b* are in elastic contact with the circumferential walls of the notch 4*b*, whereby the outer rotatable member 1 and the retainer 4 are connected together in the direction of rotation and the circumferential positioning (centering) of the outer rotatable member 1 with respect to the retainer 4 is effected.

Figure 11A:
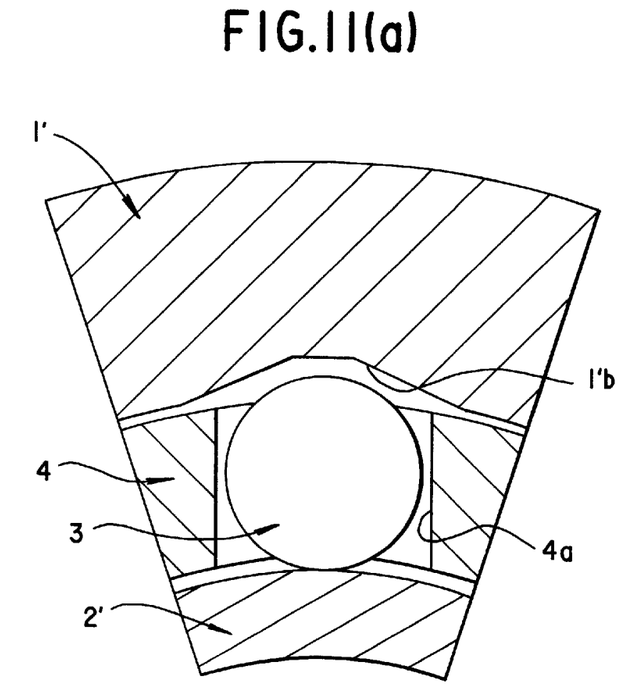

As shown in FIG. 10(*a*) (section B—B in FIG. 9) and in FIG. 11 (fragmentary enlarged view of FIG. 10(*a*)), the inner peripheral surface of the outer rotatable member 1' is formed with a plurality of can surfaces 1'*b* at circumferential equal intervals, with a wedge space defined between each can surface 1*b* and the outer peripheral surface of the inner rotatable member 2' symmetrical with respect to the forward and backward directions of rotation. Each roller 3 is disposed between each cam surface 1'*b* and the outer peripheral surface of the inner rotatable member 2' and is held in a pocket 4*a* of the retainer 4. In addition, FIGS. 10(*a*), (*b*) and 11(*a*) show a state in which the retainer 4 is centered by the centering spring 12, in which state, the circumferential center of the pocket 4*a* of the retainer 4 coincides with the circumferential center of the cam surface 1'*b*. Therefore, the roller 3 is positioned substantially in the middle of the can surface 1'*b*, and released from the wedge space extending in forward and backward directions. This state will be hereinafter referred to as the neutral position.

In FIG. 9, when the unillustrated motor starts rotating, its rotative power is transmitted at reduced speed to the outer rotatable member 1' through the worm and wormwheel mechanism 6, thereby rotating the outer rotatable member 1'. And the retainer 4 receives rotative power from the inner rotatable member 1' through the centering spring 12 and is thereby rotated. At this time, the retainer 4 is subjected to the viscoshear resistance of the highly viscous fluid 9' interposed between it and the shaft member 7'. As a result, the engaging portions 12*b* of the centering spring 12 flex, resulting in a corresponding amount of relative rotation (delay in rotation of the outer rotatable member 1') produced between the retainer 4 and the inner rotatable member 1. In addition, let k1 be the elastic force of the centering spring 12 and K2 be the viscoshear resistance of the highly viscous fluid 9'. then the relation K1<K2 is required in order for the engaging portions 12*b* of the centring spring 12 to flex.

Figure 11B:
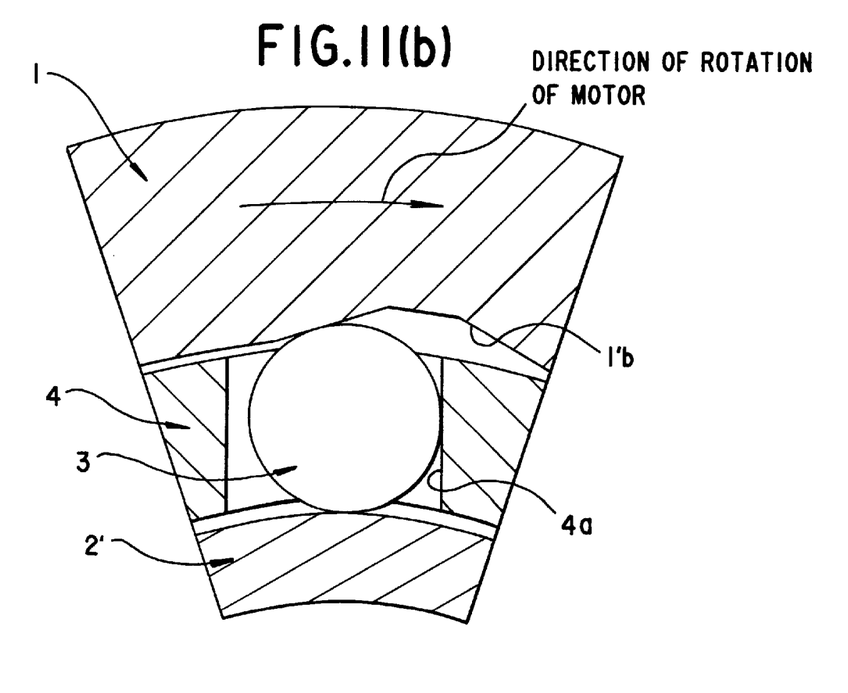

When the relative rotation is produced between the retainer 4 and the outer rotatable member 1', the roller 3 received in the pocket 4*c* in the retainer 4, as shown in FIG. 11(*b*). is pushed in the direction of rotation (direction of delayed rotation of the retainer 4) by the retainer 4 and engages the wedge space in that direction. At this time, since the outer rotatable member 1' is rotating in the direction of arrow, the rollers 3 are forced to engage the outer and inner rotatable members 1' and 2' on the principle of wedge transmitting the torque from the outer rotatable member 1' to the inner rotatable member 2' through the rollers 3, so that the inner rotatable member 2' is rotated together with the retainer 4 and outer rotatable member 1'. And the rotation of the inner rotatable member 2' opens or closes an unillustrated electrically powered window.

On the other hand, during rotation of the retainer 4, the shaft member 7' is subjected to the viscoshear resistance of the highly viscous fluid 10 interposed between it and the retainer 4. This viscoshear resistance increases with the rotation of the retainer 4 and acts as a rotative force (torque) on the shaft member 7'. The shaft member 7' is stopping as long as this rotative force is lower than the braking force of the brake member 8', but as soon as the rotative force becomes greater than the braking force, it starts rotating with respect to the casing 5. After entering into steady rotation, it makes concomitant rotation with an amount of delay corresponding to the braking force of the brake member 9 with respect to the retainer 4. After it has entered into steady rotation (after the clutch has shifted to the torque transmitting state), therefore, the viscoshear resistance of the highly viscous fluid 10 assumes a predetermined value corresponding to the braking force of the brake member 9, never assuming a greater value. The viscoshear resistance of the highly viscous fluid 10 is essentially a factor necessary for causing relative rotation between the retainer 4 and the inner rotatable member 1, i.e., for automatically shifting the clutch to the torque transmitting state, and after the clutch shift. It should desirably be as low as possible. Let K3 be the braking force of the brake member 8', then it is necessary to satisfy the relation K3≧K2 (viscoshear resistance upon clutch shift)>K1 (elastic force of the centering spring 12), and it is desirable that the braking force K3 be set at a minimum value in the range satisfying this relation.

As described above, in this embodiment, the shaft member 7' is brake-fixed to the stationary member (casing 5) by the brake member 8'; however, when the rotation to be transmitted through the clutch is low, the shaft member 7' may be perfectly fixed to the stationary member (casing 5) in the direction of rotation (the word "perfectly" is used in connection with brake). For example, the inner diameter of the end of the shaft member 7' and the shaft portion 5*a* may be connected together by polygonal fitting (for example, by making the inner diameter of the end of the shaft portion 7' a square hole and the shaft portion 5*a* a square shaft and fitting them together). Particularly, when applied to the electrically powered slide door in a one-box car, the clutch, though of such arrangement, can serve for practical use since in this case it is used often at low speed. In this case, as a viscous fluid it is desirable to use a fluid which is somewhat less viscous than said highly viscous fluid 9'.

When the driving motor stops and the outer rotatable member 1' and the retainer 4 stop rotating, the viscoshear resistance of the highly viscous fluid 9' disappears, so that the elastic recovery force of the centering spring 12 causes the retainer 4 to rotate with respect to the inner rotatable member 1 until it is centered at the neutral position shown in FIGS. 10(*a*), (*b*) to 11(*a*). In addition, the retainer 4 is subjected to the viscoshear resistance from the highly viscous fluid 9' during relative rotation to the neutral position; however, since the viscoshear resistance is proportional to the relative rotational speed, the inner rotatable member 1 is allowed to rotate, though at a speed lower than that of the driving motor.

When the retainer 4 is centered with respect to the outer rotatable member 1' in this manner, the rollers 3 are released from the wedge spaces to return to the neutral position, so that the inner rotatable member 2' becomes free with respect to the outer rotatable member 1' and is released from the input system. Therefore, in this state, the inner rotatable member 2' can be manually rotated and hence even if the driving motor is stopped, the electrically powered window can be manually opened or closed.

Figure 12:
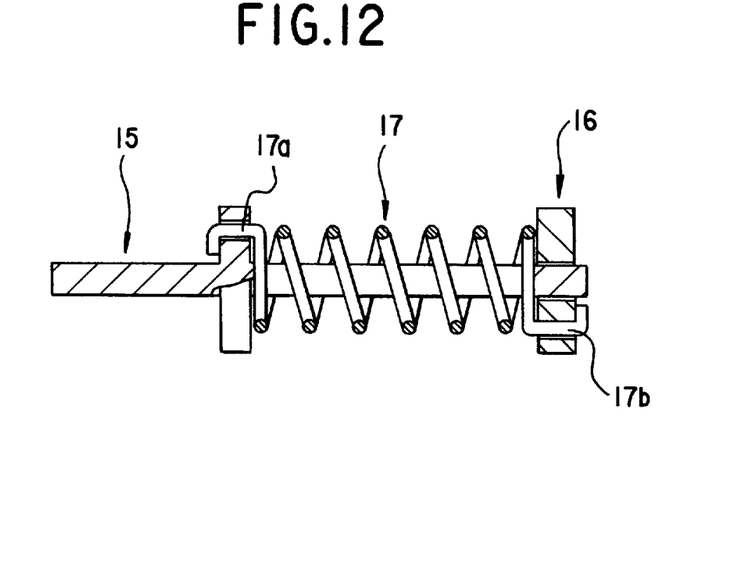
FIG. 12 is a sectional view showing an example of reversing means.

In this connection, if the force with which the rollers 3 engage the outer and inner rotatable members 1' and 2' is greater, it is possible during stoppage of the driving motor that the centering of the retainer 4 cannot be effected quickly by means of only the restoring force of the centering spring 12. (During stoppage of the driving motor, one reaction or another usually remains, sometimes making it impossible to effect the centering of the retainer 4.) In such case, it is the reversing rotation means which realizes quick centering of the retainer 4; it is effected by rotating the outer rotatable member 1' backward (counterclockwise in FIG. 11(*b*)) by a predetermined amount from the stop position. The reverse rotation means may have any desired arrangement provided that it achieves such function. For example, an arrangement may be employed which electrically controls the rotation of the driving motor; however, in this embodiment, it employs a mechanical system as shown in FIG. 12, comprising a fly wheel 16 rotatably mounted on the shaft portion 15 of the input system and a coil spring 17 connected at one end thereof to the shaft portion 15 and at the other end to the fly wheel 16. The shaft portion 15 is connected, e.g., to the output shaft of the driving motor. When the driving motor stops, the inertial energy of the fly wheel 16 is stored in and released by the coil spring 17, whereby the worm shaft 6*a* and the outer rotatable member 1' are reversely rotated by a predetermined amount. And the reverse rotation of the outer rotatable member 1' causes disengagement of the rollers 3, providing quick and reliable centering of the retainer 12. Therefore, the outer rotatable member 2' is quickly and reliably released from the input system, thereby enabling quick and reliable, manual opening and closing of the electrically powered slide door.

In the above embodiment, when the rotative power of the driving motor is to be fed through the inner rotatable member 2', this can be attained by providing a can surface on the outer peripheral surface of the inner rotatable member 2' and interconnecting the inner rotatable member 2' and retainer 4 by an elastic member corresponding to the centering spring 12.

Figure 13:
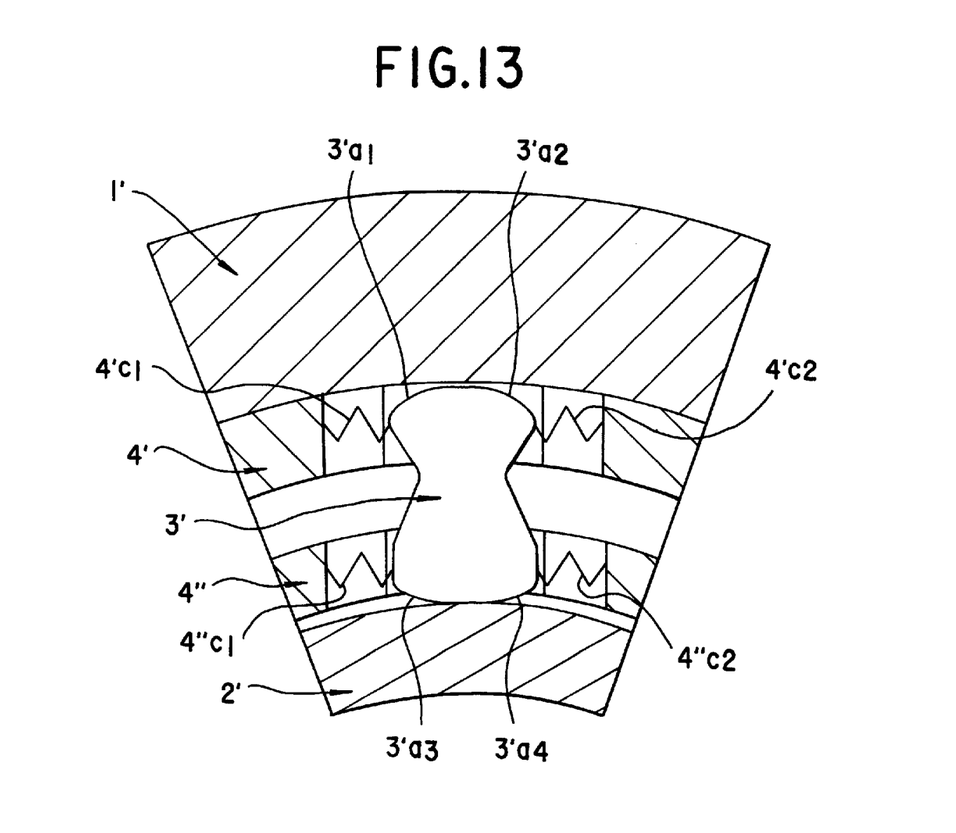
FIG. 13 is an enlarged sectional view showing a peripheral region including a torque transmission member according to another embodiment of the invention.

An embodiment shown in FIG. 13 employs a sprag 3' serving as a torque transmission member. The rest of the basic arrangement is the same as in FIG. 9. The sprag 3' has cam surfaces 3'*a*1, 3'*a*2, 3'*a*3, 3'*a*4 in the forward and backward directions and is received in the pockets of the outer and inner retainers 4' and 4" through springs 4'*c*1. 4'*c*2, 4"*c*1, 4"*c*2. The outer retainer 4' is connected to the inner diameter of the outer rotatable member 1' by suitable means, while the inner retainer 4" is fixed to the outer rotatable member 1' in the direction of rotation through the centering spring 12 shown in FIG. 9. Further, a viscous fluid, e.g., a highly viscous fluid 9', is sealed in a clearance between the inner retainer 4" and the shaft member 7' shown in FIG. 9. In the state shown in FIG. 13, the sprag 3' is held in the neutral position as it is uniformly pressed in circumferentially opposite directions by the springs 4'*c*1, 4'*c*2, 4'*c*1, 4"*c*2. In this state, the sprag 3' engages neither the inner peripheral surface of the outer rotatable member 1' nor the outer peripheral surface or the inner rotatable member 2'.

When the motor starts rotating, a relative rotation takes place in the aforesaid manner between the inner retainer 4" and the outer rotatable member 1' (delay in rotation of the inner retainer 4"), so that the sprag 3' is tilted, causing the can surfaces 3'*a*1, 3'*a*4 (or cam surfaces 3'*a*2 and 3'3) to engage both the inner peripheral surface of the outer rotatable member 1' and the outer peripheral surface of the inner rotatable member 2'. Thereby, the torque is transmitted from the outer rotatable member 1' to the inner rotatable member 2' through the sprag 3'. On the other hand, when the driving motor stops rotating, the inner retainer 4" is centered with respect to the outer rotatable member 1' in the manner described above, so that the sprag 3' returns to the neutral position shown in FIG. 13, releasing the inner rotatable member 2' from the input system. In order to realize quick and reliable centering of the inner retainer 4", the aforesaid reversing means may be provided.

In addition, in the case where the outer retainer 4' is connected to the outer rotatable member 1' by the centering spring 12, a viscous fluid, e.g., a highly viscous fluid 9', is interposed between the outer retainer 4' and the shaft portion 7' shown in FIG. 1. Further, in the case where the torque from the driving motor is to be fed through the inner rotatable member 2', the inner rotatable member 2' and the outer retainer 4' or inner retainer 4" may be interconnected in the direction of rotation by an elastic member corresponding to the centering spring 12. Further, in the above embodiment, the springs 4'*c*1 and 4'*c*2 and/or springs 4"*c*1 and 4"*c*2 may be omitted.

What is claimed is:

1. A clutch unit comprising an inner rotatable member, an outer rotatable member, torque transmission members disposed between said inner and outer rotatable members, said torque transmission members being adapted to effect torque transmission and interruption through wedge engagement and disengagement, respectively between said inner and outer rotatable members, a retainer for retaining said torque transmission members, wherein one of three members comprising said inner rotatable member, said outer rotatable member and said retainer is used as an input member powered by an input source and wherein one of the remaining two members is used as a differential member, an elastic member for connecting said input member and said differential member to each other in the direction of rotation, a fixed member brake-fixed or fixed to a stationary member in the direction of rotation, and a viscous fluid between said differential member and said fixed member, said viscous fluid generating a viscoshear resistance as said differential member relatively rotates with respect to said fixed member, wherein the engagement and disengagement of said torque transmission members is controlled by a relative rotation of said differential member with respect to said input member effected through said viscoshear resistance of said viscous fluid and an elastic force of said elastic member.

2. A clutch unit as set forth in claim 1, further comprising a reversing means for rotating said input member backward by a predetermined amount from its rotation stop position when said input source stops.

3. A clutch unit as set forth in claim 2, wherein said reversing means has a fly wheel rotatably mounted on a shaft portion provided at a region from said input member to said input source, and a coil spring connected at one end thereof to said shaft portion and at another end to said fly wheel.

* * * * *